United States Patent
Chaudhari et al.

(10) Patent No.: US 10,498,474 B2
(45) Date of Patent: Dec. 3, 2019

(54) CROSS-LAYER TIME SYNCHRONIZATION METHOD

(71) Applicant: QATAR FOUNDATION FOR EDUCATION, SCIENCE AND COMMUNITY DEVELOPMENT, Washington, DC (US)

(72) Inventors: Qasim Mahmood Chaudhari, Doha (QA); Khalid Ali Qaraqe, Doha (QA); Erchin Serpdin, College Station, TX (US)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 16/068,104

(22) PCT Filed: Jan. 4, 2017

(86) PCT No.: PCT/US2017/012179
§ 371 (c)(1),
(2) Date: Jul. 3, 2018

(87) PCT Pub. No.: WO2017/120227
PCT Pub. Date: Jul. 13, 2017

(65) Prior Publication Data
US 2019/0020432 A1    Jan. 17, 2019

Related U.S. Application Data

(60) Provisional application No. 62/274,648, filed on Jan. 4, 2016.

(51) Int. Cl.
H04B 7/212 (2006.01)
H04J 3/06 (2006.01)
(Continued)

(52) U.S. Cl.
CPC .......... H04J 3/0661 (2013.01); H04J 3/0644 (2013.01); H04L 27/2657 (2013.01);
(Continued)

(58) Field of Classification Search
CPC ... H04J 3/0661; H04J 3/0644; H04L 27/2662; H04W 56/001
See application file for complete search history.

(56) References Cited

U.S. PATENT DOCUMENTS 8,102,787 B2   1/2012   Wang et al.
8,494,009 B2   7/2013   Fourcand
(Continued)

OTHER PUBLICATIONS

Noh et al., "A New Approach for Time Synchronization in Wireless Sensor Networks: Pairwise Broadcast Synchronization", IEEE Transactions on Wireless Communications (2008), vol. 7(9), pp. 3318-3322.
(Continued)

*Primary Examiner* — Bo Hui A Zhu
(74) *Attorney, Agent, or Firm* — Richard C. Litman; Nath, Goldberg & Meyer

(57) ABSTRACT

The cross-layer time synchronization method is a cross-layer synchronization approach that utilizes a timing recovery module at a physical layer (PHY), derives the information about the clock frequency offset from the timestamp-embedded message, and exploits it for synchronization at the higher layers. This approach either results in minimizing the cost of synchronization resulting in energy efficiency or improving the accuracy of the clock parameters' estimates by exploiting the PHY information. Some applications of this cross-layer technique include, but are not limited to, energy efficient wireless networks, cooperative networks or distributed MIMO networks.

7 Claims, 8 Drawing Sheets

(51) Int. Cl.
    *H04L 27/26*    (2006.01)
    *H04W 56/00*    (2009.01)
    *H04B 7/0413*   (2017.01)
(52) U.S. Cl.
    CPC ....... *H04L 27/2662* (2013.01); *H04W 56/001*
        (2013.01); *H04B 7/0413* (2013.01)

(56) References Cited

U.S. PATENT DOCUMENTS

| | | |
|---|---|---|
| 2009/0147806 A1 | 6/2009 | Brueckheimer |
| 2011/0216747 A1 | 9/2011 | Shao et al. |
| 2012/0163521 A1 | 6/2012 | Kirrmann et al. |
| 2013/0315346 A1* | 11/2013 | Varma ................. H04L 7/0008 375/316 |
| 2014/0010244 A1 | 1/2014 | Bui et al. |
| 2014/0233556 A1 | 8/2014 | Li et al. |
| 2014/0355628 A1 | 12/2014 | Akhlaq et al. |
| 2015/0139251 A1 | 5/2015 | Tzeng |

OTHER PUBLICATIONS

Chaudhari, "A Simple and Robust Clock Synchronization Scheme", IEEE Transactions on Communications (2012), vol. 60(2), pp. 328-332 (Abstract only).

Sun et al., "On Clock Offset and Skew Estimation with Exponentially Distributed Delays", IEEE International Conference on Communications (ICC) (2013), 6 pages.

Hashmi et al., "Using physical layer clock recovery to augment application layer time synchronization", Journal of Supercomputing (Feb. 2015), vol. 71, Iss. 6, pp. 2153-2176.

* cited by examiner

CROSS-LAYER TIME SYNCHRONIZATION METHOD

TECHNICAL FIELD

The present invention relates to clock synchronization in a wireless network, and particularly to a cross-layer time synchronization method that utilizes the timing recovery module at the physical layer, derives information about the clock frequency offset from the timestamp-embedded message, and exploits it for synchronization at higher layers.

DISCLOSURE OF INVENTION

The cross-layer time synchronization method is a cross-layer synchronization approach that utilizes a timing recovery module at a physical layer (PHY), derives the information about the clock frequency offset from the timestamp-embedded message, and exploits it for synchronization at the higher layers. This approach either results in minimizing the cost of synchronization resulting in energy efficiency or improving the accuracy of the clock parameters' estimates by exploiting the PHY information. Some applications of this cross-layer technique include, but are not limited to, energy efficient wireless networks, cooperative networks or distributed MIMO networks.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1:
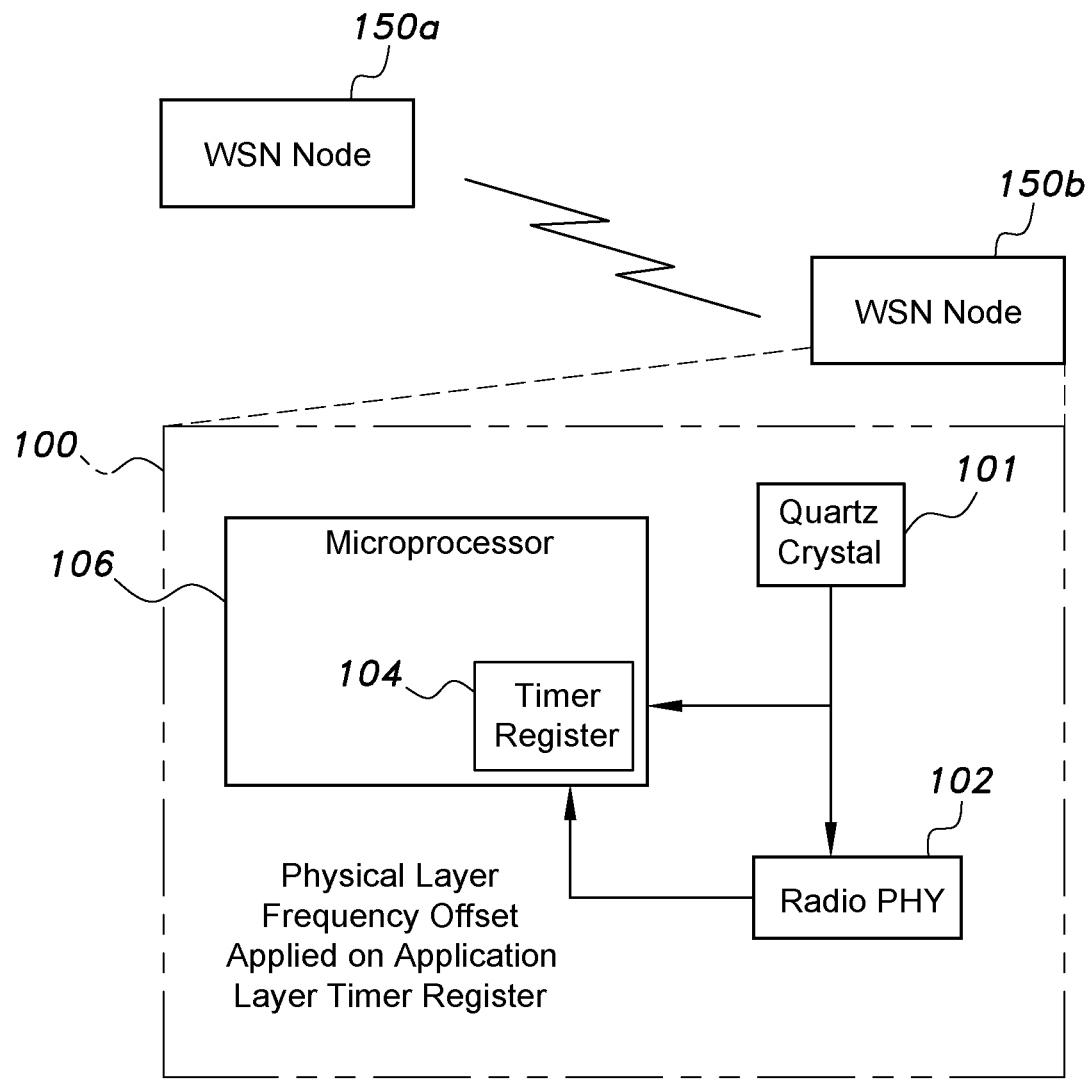
FIG. 1 is a block diagram of an exemplary wireless sensor network node, illustrating connection between physical layer frequency offset and the application layer time register.

The cross-layer time synchronization method may be utilized in a scenario where the symbol rate is driven by a system clock in a digital modulator, and the ADC and the digital demodulator share the same clock. The present method utilizes a cross-layer synchronization approach which can utilize the timing recovery module at the physical layer, derive the information about the clock frequency offset from the timestamp-embedded message, and exploit it for synchronization at higher layers. This approach either results in minimizing the cost of synchronization, resulting in energy efficiency or improving the accuracy of the clock parameter estimates by exploiting the PHY (physical layer) information. Some applications of this cross-layer technique include, but are not limited to, energy-efficient wireless networks, cooperative networks, or distributed MIMO (multiple-input, multiple-output) networks.

In distributed wireless systems, a global notion of time is often required for such applications as power-efficient duty cycling, event ordering, ranging, target localization and tracking, security protocols, data fusion, Time Division Multiple Access (TDMA) radio schedule and database systems, and other applications. Due to various reasons, these local clocks can possess diverse clock phase offsets (also called time offset) and clock frequency offsets (also called skew, the speed with which they keep wandering away from each other). Time synchronization has to be performed to correct these clock phase and frequency offsets in distributed systems and ensure that physically distributed processors agree to a common time.

At the physical layer of single-carrier systems, the purpose of the time synchronization module at PHY (also known as symbol timing synchronization, clock synchronization, or timing recovery) is to produce a certain number of samples at the matched filter outputs during each symbol interval such that one of the samples is aligned with the maximum eye opening of the employed pulse shape. In multi-carrier systems, the symbol timing best solution implies finding the correct location of the receiver window of samples as input to the FFT (Fast Fourier Transform) block, and the sampling clock correction involves controlling the sampling instants at the receiver to check the window drift. The purpose of this discovery is to exploit the information from PHY in synchronizing the clocks at the lighter layers.

To synchronize a network, two or more nodes must exchange application layer timing messages with each other, which are nothing but a physical layer transmission of electromagnetic waves embedding their current timestamps just before the transmission. The packet structure can be of any format, e.g., a header and the timestamp value followed by the regular payload, but the timing synchronization block can extract the clock frequency offset between the two nodes according to the PHY standard implemented for communication before the embedded timestamp can be actually inferred at the higher layers. The enormous benefit of this approach comes from the fact that the algorithms at the higher layers can exploit the PHY information to improve their accuracy through any statistical technique, such as, but not limited to, using the probability density function (pdf) of the PHY estimate as a prior pdf for higher layer Bayesian estimation. If the packet is long enough, the nodes can also be frequency-locked with each other during a single timestamp packet transfer (performed for adjusting the clock phase offset), and the main source of network energy used for synchronization purposes involving multiple timing packet exchanges—arising from the need to correct the clock frequency offset—will not be required anymore.

It has been verified conceptually through simulations in Matlab and through experimentation on TI TMS320C67t3 Digital Signal Processor kits but not in a wireless environment.

Application layer clocks are usually timers that count the oscillations of the crystal and maintain two registers to define that how many oscillations of the crystal is equal to one application layer clock tick. A clock used for symbol timing synchronization at the physical layer also counts the oscillations of the same quartz crystal. The fact that is exploited to perform the cross-layer synchronization is that both the clocks at the physical layer and at the application layer are derived from the oscillation of quartz crystal, as the devices with one hardware oscillator implement every clock within that device as:

$$C(t) = k\int_{t_0}^{t} \omega(t)dt + C(t_0), \quad (1)$$

where t is real time, $\omega(t)$ is the angular frequency of oscillator and k is the constant of proportionality. C(t) is a notation used to represent the physical layer clock or the application layer clock. It provides oscillations of quartz crystal within a device to provide the clock information. The integration t to $t_0$ represents oscillations counting from the initial time $t_0$ to final time t. $C(t_0)$ is the initial offset of the clock value that can be set to zero in case no initial offset is defined.

Time synchronization at the physical layer is known to those of ordinary skill in the art. For example, in some applications, many symbol timing synchronization systems are used with different modulation schemes, interpolators, timing error detectors, loop filters, and interpolation control.

The present physical layer time synchronization system is for binary pulse amplitude modulation (PAM) and is based on a zero-crossing timing error detector (ZC-TED) using a piecewise parabolic interpolator, proportional plus integrator loop filter, and modulo-1 counter interpolation control. This synchronization system is for a physical layer clock recovery process. It is designed to track and compensate for the phase and frequency error of the clock. The output of the matched filter x(nT) is fed to a piecewise parabolic interpolator for kth interpolant that is defined as:

$$x((m(k)+u(k))T) = \left(\frac{u(k)^3}{6} - \frac{u(k)}{6}\right)x((m(k)+2)T) - \left(\frac{u(k)^3}{2} - \frac{u(k)^2}{2} - u(k)\right)x((m(k)+1)T) + \left(\frac{u(k)^3}{2} - u(k)^2 - \frac{u(k)}{2} + 1\right)x(m(k)T) - \left(\frac{u(k)^3}{6} - \frac{u(k)^2}{2} + \frac{u(k)}{3}\right)x((m(k)-1)T), \quad (2)$$

where m(k) is base point index and μ(k) is the fractional change, and these two values are computed by modulo-1 counter interpolation control and fed to the interpolator.

The above equation is used to find out the interpolant that is the output sample of the physical layer time synchronization system. It works over the output of a matched filter and computes the best possible sample to be selected (i.e., the sample at the maximum eye opening of the matched filter output) with the help of the offset of the clock that is tracked by the PLL (phase-locked loop) of the synchronization system.

The output of the interpolator is processed by the ZC-TED operating at 2 samples/symbol, which tries to find the zero-crossing in the eye diagram and give zero error when perfectly aligned. The timing error signal is given by:

$$e(k) = x((k-\tfrac{1}{2})T_S + \hat{\tau})[a(k-1) - a(k)], \quad (3)$$

where a(k) and a(k−1) are symbol decisions for binary PAM, as defined by:

$$a(k-1) = \text{sgn}\{x((k-\tfrac{1}{2})T_S + \hat{\tau})\} \quad (4)$$

$$a(k) = \text{sgn}\{x(kT_S + \hat{\tau})\}. \quad (5)$$

Equation 3 represents the timing error signal that is used to compute the time frequency offset (drift). This error signal is computed with the help of two previous samples and the output of the interpolator.

The output of the loop filter, with constants $K_1$ and $K_2$, is fed to modulo-1 interpolation control to compute the estimate of fractional change and base point index. $K_1$ and $K_2$ can be computed using $K_p$ and $K_0$ (loop gains), $B_n$ (noise bandwidth), $T_s$ (symbol time), T (sample time), $N = T_s T$ and loop parameter ξ. Tracking performance and acquisition time of the synchronization system depend on the above parameters of the loop filter. The loop parameters $K_1$, $K_2$, $K_p$, $K_0$ and ξ are related to noise bandwidth $B_n$ as $$K_p K_0 K_1 = \frac{4\xi B_n}{\xi + \frac{1}{4\xi}} \text{ and } K_p K_0 K_2 = \frac{4B_n^2}{\left(\xi + \frac{1}{4\xi}\right)^2}.$$

Figure 8:
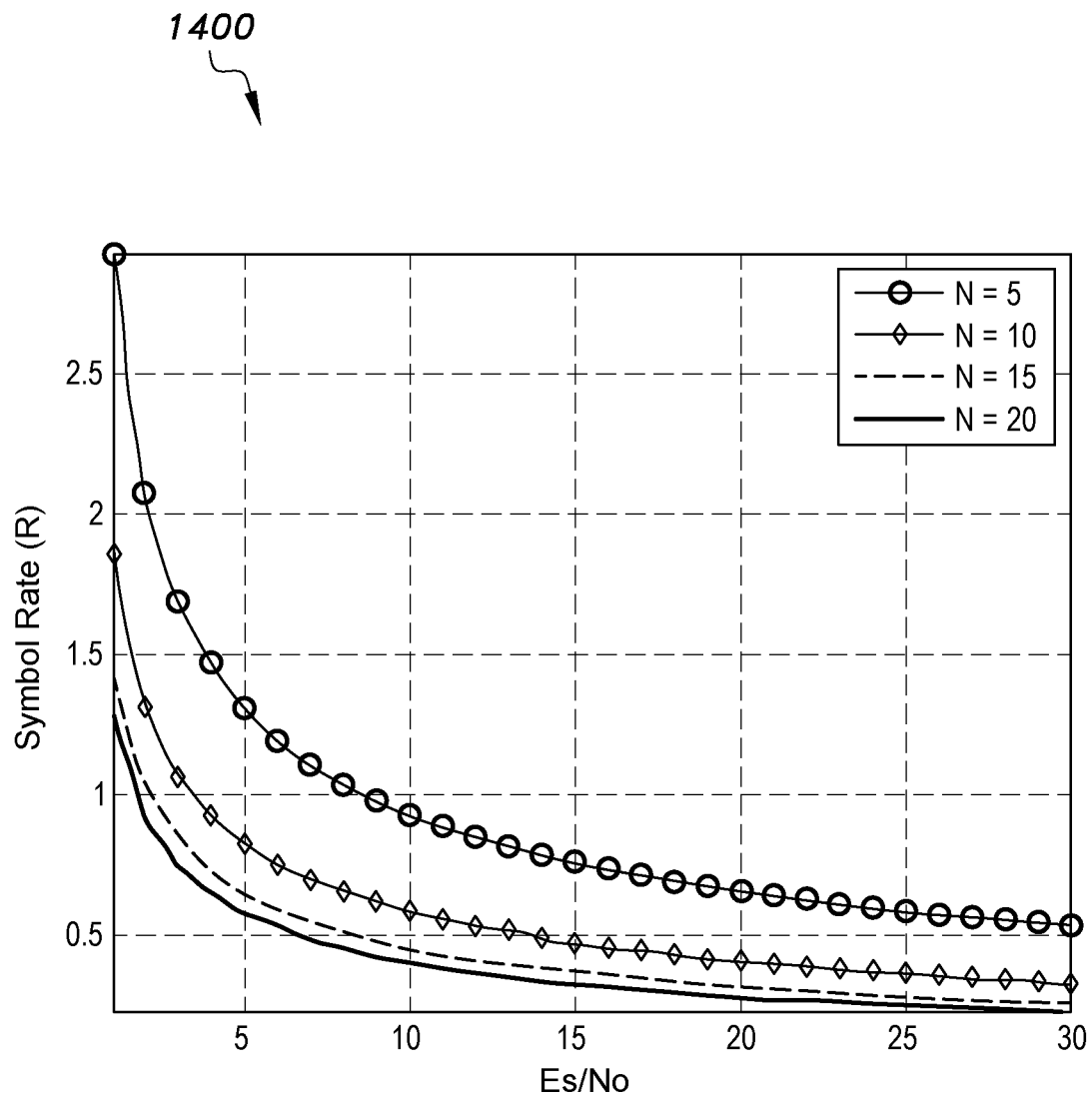
FIG. 8 is a plot showing calculated results for a required symbol rate for the cross-layer time synchronization method according to the present invention.

The required symbol rate decreases by increasing symbol-to-noise energy $E_S$ $N_0$ and number of time stamps N, as shown in graph 1400 of FIG. 8. The acquisition time $T_{LOCK}$ of the PLL depends on the time required to track phase $T_{PL}$ and frequency offset $T_{FL}$ as $T_{LOCK} \approx T_{FL} + T_{PL}$. Now, $T_{FL}$ and $T_{PL}$ are directly related to the noise bandwidth, and that is why the loop parameters will have an impact over the acquisition time that is required to track the phase ($T_{PL} \approx 1.3 B_n$) and frequency offset:

$$T_{FL} \approx 4\frac{(\Delta f)^2}{B_n^3},$$

where Δf is the frequency offset.

Modulo-1 counter interpolation control uses the output of loop filter v(n) to find the base point index m(k) and fractional interval μ(k). The fractional interval is computed using the modulo-1 counter η values and the following equation:

$$\eta(n+1) = (\eta(n) - W(n)) \bmod 1, \quad (6)$$

where W(n) = 1/N + v(n). Whenever the value of η underflows, then n = m(k). Now, to find the fractional interval μ(k) for the computed basepoint index m(k), we have:

$$\mu(m(k)) = \frac{\eta(m(k))}{W(m(k))}. \quad (7)$$

μ(k) and m(k) are now used to compute the next interpolant. Using the above iterative synchronization system, the variations of fractional change μ can be used to compute the actual frequency offset. Different methods for computation of frequency offset are known by those having ordinary skill in the art. The frequency offset is computed here using the slope of the fractional change, and new sampling rate can be given by the equation below to achieve time synchronization at the physical layer:

$$f_s = (2+m)f_d, \quad (8)$$

where $f_s$ is new sampling rate, $f_d$ is a symbol rate, and m is the slope of the fractional change.

Figure 2:
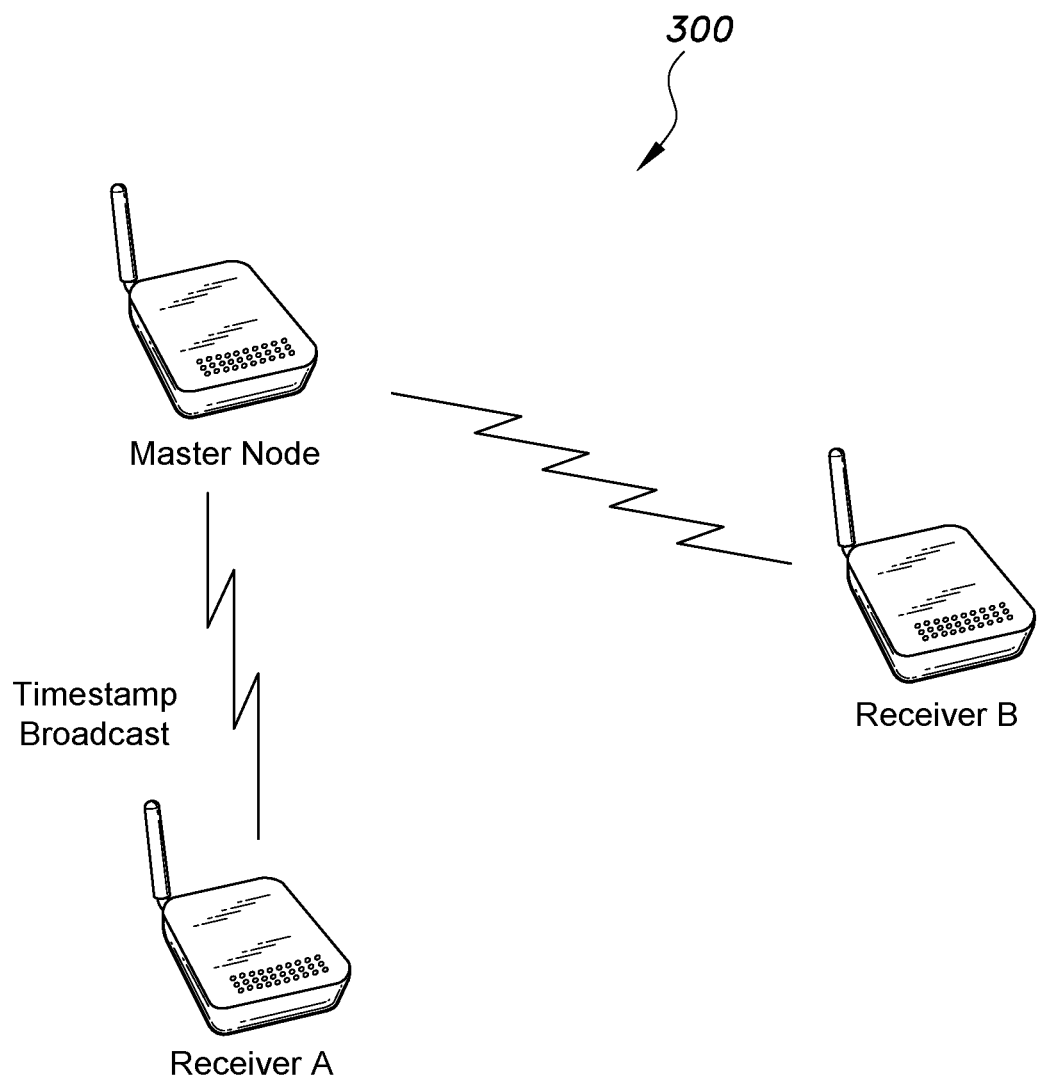
FIG. 2 is a schematic diagram of a wireless sensor network using FTSP for clock synchronization.

Time synchronization at the application layer can simply be modeled as transmission of master node time stamps to other nodes and correction of phase and frequency when using the Flooding Time Synchronization Protocol (FTSP), as shown in the exemplary wireless sensor network 3000 of FIG. 2. FTSP is a very widely used time synchronization protocol at the application layer because of the benefits offered by it. The master node wraps its time stamp in the message and transmits this message to all receivers in a distributed network. This message instructs the receivers to note their clock values and compare it with the timestamp received to perform synchronization.

Time synchronization at the application layer uses FTSP protocol in the network 300 of two receivers (Receiver A and Receiver B). The master node broadcasts its time stamp to both receivers. On the reception of time stamps, these receivers compare their clock values to the received one and, hence, are synchronized. Synchronization accuracy can be increased by increasing the number of time stamp broadcasts. Increasing the number of broadcasts, however, reduces the energy efficiency of the synchronization protocol.

A single time-stamp broadcast can only help for phase correction. Multiple timestamp broadcasts are required to get frequency synchronization. Frequency error can be calculated by finding the slope of the line created by the time stamps. A simple method to find the slope or frequency error $f_e$ is given by:

$$f_e = \frac{y_n - y_1}{x_n - x_1} \quad (9)$$

where $y_n$ and $y_1$ are the $n^{th}$ and first time stamps of the receiver A, and $x_n$ and $x_1$ are the $n^{th}$ and first time stamps of the receiver B. Least square (LS) estimate can give a better estimate of frequency error. LS estimate can be applied to the time stamps exchanged to get the estimate of a straight line. Unlike the first method, LS uses all the time stamps to compute the slope and, hence, is more accurate. The slope of the line is the frequency offset at the application layer. Time stamps are used as data points in a LS estimate, and error is minimized between data points and the straight line, which is given by:

$$e = \sum_{i=1}^{N} (y_i - \hat{y}_i)^2 \quad (10)$$

where $y_i$ are data points and $\hat{y}_i$ are points of a computed straight line given by y=mx+c. To find m and c, the least square estimate of a straight line is:

$$\begin{bmatrix} m \\ c \end{bmatrix} = (X^T X)^{-1} X^T Y \quad (11)$$

where X and Y correspond to the time stamps of receiver A and receiver B.

Time synchronization has to be done at the physical layer and at the application layer of any distributed wireless network. Whenever the time needs to be synchronized at two different nodes, it starts from the synchronization at the physical layer, and then synchronizes at the application layer. As shown by the diagram of a sensor node's circuit 100 in FIG. 1, according to the present method, the heart of both layer's clock is a quartz crystal 101. Once the synchronization at the physical layer is achieved, frequency offset of physical layer clock can be applied to the application layer clock, which saves energy required to synchronize at the application layer.

The nodes using the cross-layer time synchronization method are assumed to be synchronized in-phase, or phase synchronization can be achieved using any application layer protocol (such as FTSP) once, or a simple cross-layer packet including one time stamp can also provide the time phase synchronization. WSN node 150a transmits to WSN node 150b, where the cross-layer time synchronization includes a microprocessor 106 maintaining a timer register 104. Internal crystal timebase 101 is fed to the timer register 104 and also to the radio (PHY) 102. Timing signals from PHY 102 are also sent to the timer register 104.

Figure 3:
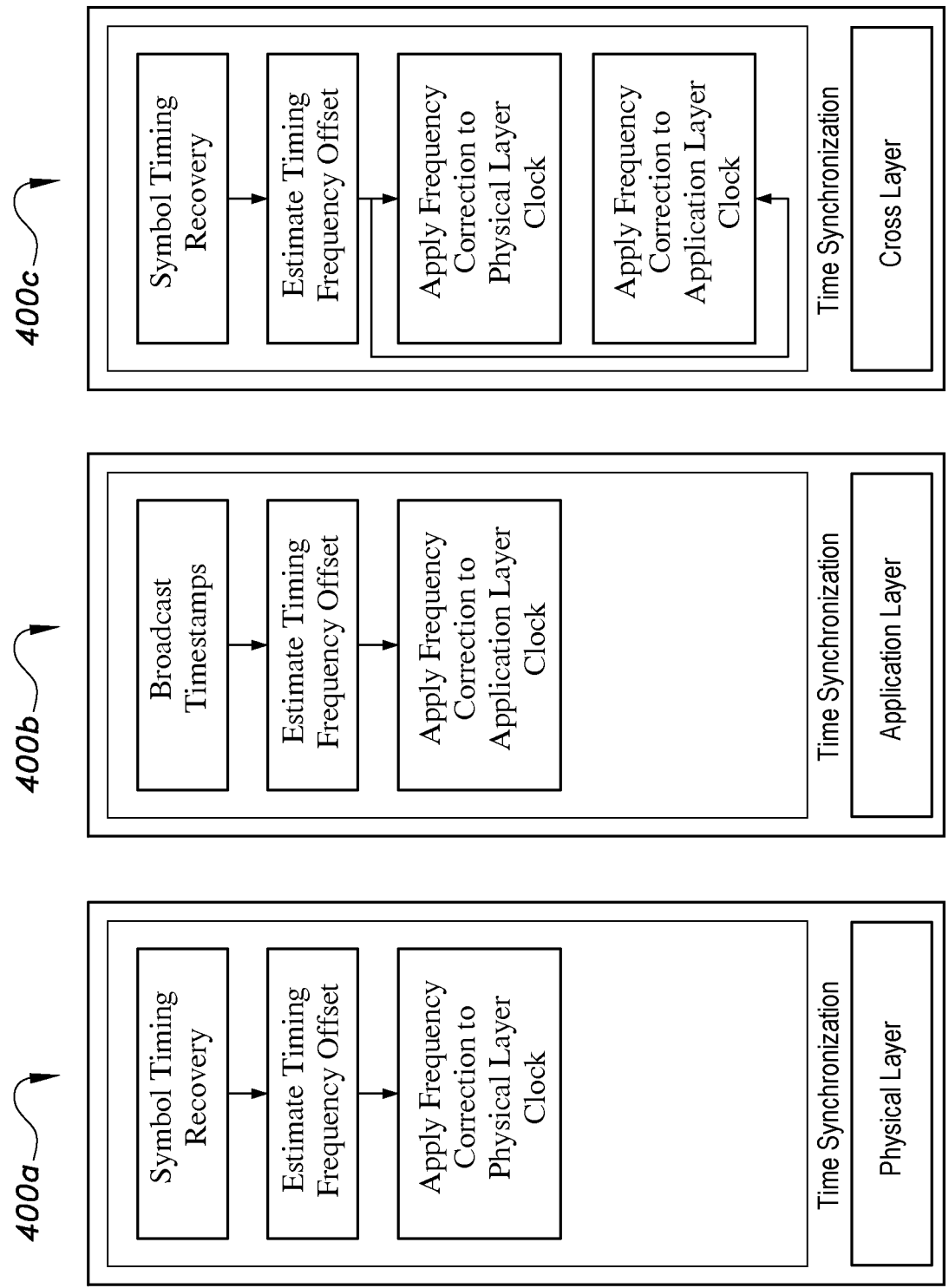
FIG. 3A is a flowchart of time synchronization at the physical layer only.
FIG. 3B is a flowchart of time synchronization at the application layer only.
FIG. 3C is a flowchart of time synchronization using the cross-layer time synchronization method according to the present invention.

To elaborate the cross-layer approach, flowcharts are shown in FIGS. 3A, 3B, and 3C. The physical layer time synchronization 400a includes steps of symbol timing recovery, frequency offset estimation, and application of the estimate to the physical layer clock. Application layer time synchronization 400b broadcasts time stamps, estimates timing frequency offset, and applies frequency correction to the application layer clock. The present cross-layer time synchronization method 400c entails symbol timing recovery, timing frequency offset estimation, application of the frequency correction to the physical layer clock, and application of the frequency correction to the application layer clock.

Figure 4:
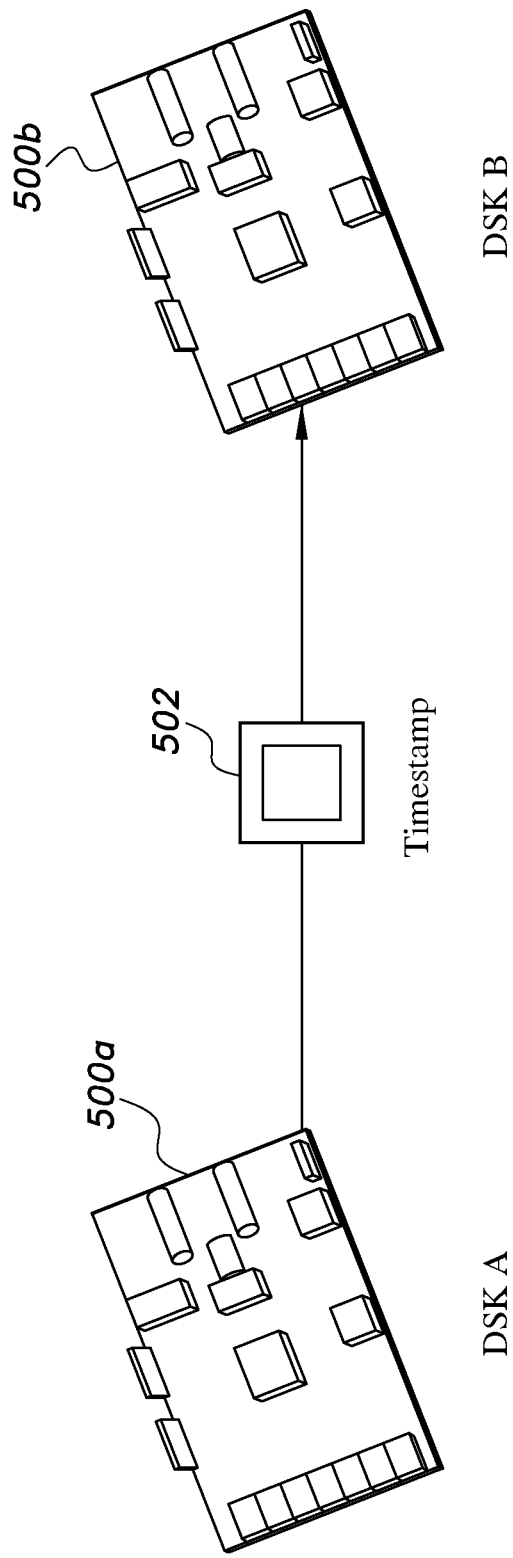
FIG. 4 is a schematic diagram of an experimental test system for testing the cross-layer time synchronization method according to the present invention.

Experimentation setup for the proposed time synchronization model is done using two TMS320C6713 DSP Starter Kits (DSKs 500a and 500b, as shown in FIG. 4). The experimentation consists of two synchronization systems, one at the physical layer and one at the application layer. The frequency offset computed at both layers comes out to be same, which shows that the physical layer frequency offset can be used to adjust the application layer clock. Keeping this in mind, an experimental setup is created that uses the two DSKs 500a and 500b connected together as shown in FIG. 4.

DSK A 500a acts as a transmitter and DSK B 500b acts as a receiver. Both DSKs need to be synchronized in time. The data that are transmitted from DSK A 500a to DSK B 500b contains the timestamp 502, which provides the time phase offset at the receiver, and therefore helps in achieving synchronization at both ends. In addition, the time frequency offset is also estimated from the transmitted timestamp 502 by applying symbol timing recovery.

DSK A 500a uses binary pulse amplitude modulation (PAM) with symbols +1 and −1. Symbols are generated with a symbol rate of 4,000 symbols/s. The sampling rate is set to be 16,000 samples/s. The samples per symbol are computed to be four, and total samples are 22,000. Binary PAM symbols are up-sampled by four and pulse shaped using a square root raise cosine with fifty percent excess bandwidth and transmitted over the channel to DSK B 500*b*. DSK B 500*b* initializes its processing by match filtering the data. The matched filter uses the square root raise cosine with fifty percent excess bandwidth. Symbols are down-sampled to two samples/symbol and fed to the system for time synchronization at the physical layer. Time synchronization at DSK B 500*b* involves a piecewise parabolic interpolator, zero-crossing timing error detector, proportional plus integrator loop filter and modulo-1 decrement counter interpolation control. The parameters that are needed for the loop filter for acquisition and tracking efficiency are BnTs=0.005, =1/$\sqrt{2}$, $K_p$=2.7, $K_0$=-1, N=2.

The slope of the fractional interval is used to compute the frequency offset. Least square (LS) estimate is used to find the slope of the fractional interval. LS is applied to the fractional interval graph using different numbers of transmitted symbols. The result shows that the estimate of the frequency offsets improves in accuracy by increasing the number of transmitted symbols. The physical layer offset over 22,000 symbols is found to be 1.3139 ppm.

Figure 5:
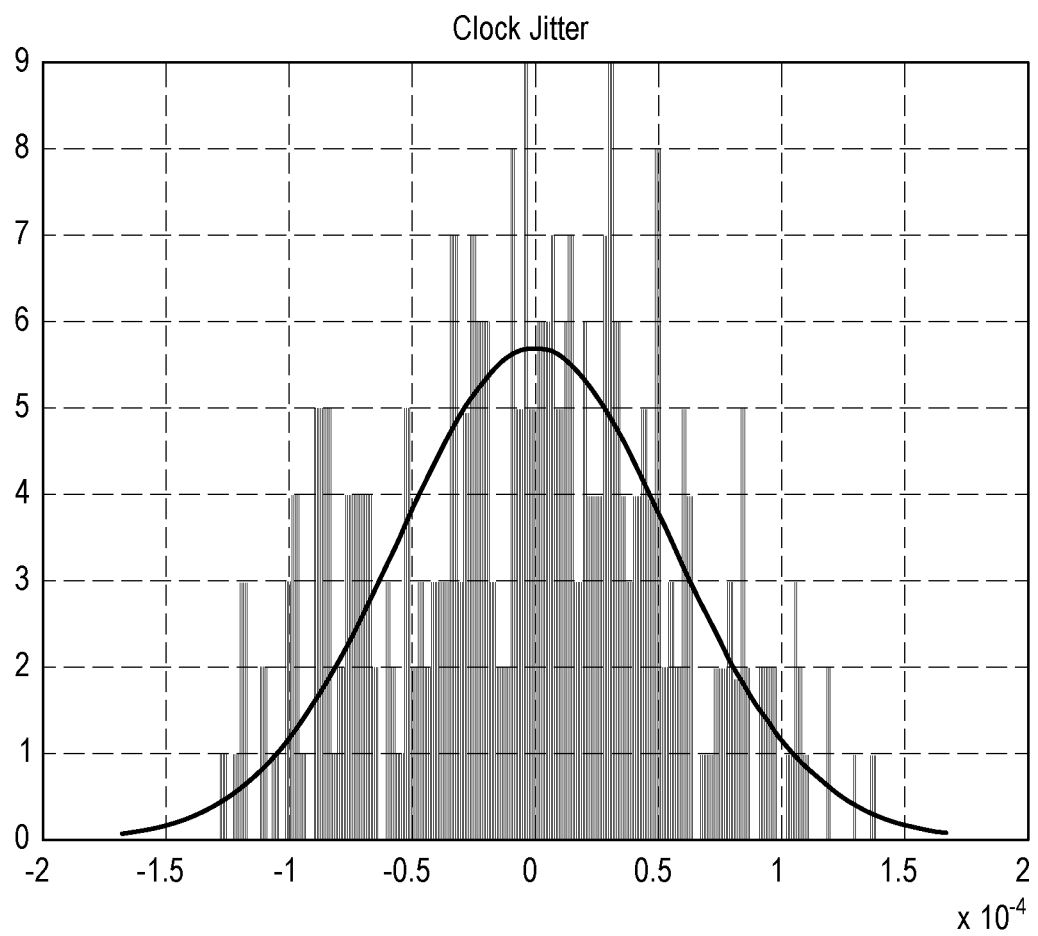
FIG. 5 is a histogram showing clock jitter in the receiver of the system of FIG. 4.

Clock jitter of DSK B 500*b* is found by taking the histogram of the variations in clock and comes out to be Gaussian, as shown in graph 800 of FIG. 5. These clock variations are also visible in graph 600, and thus the fractional interval results can be used to visualize the clock jitter.

Figure 6:
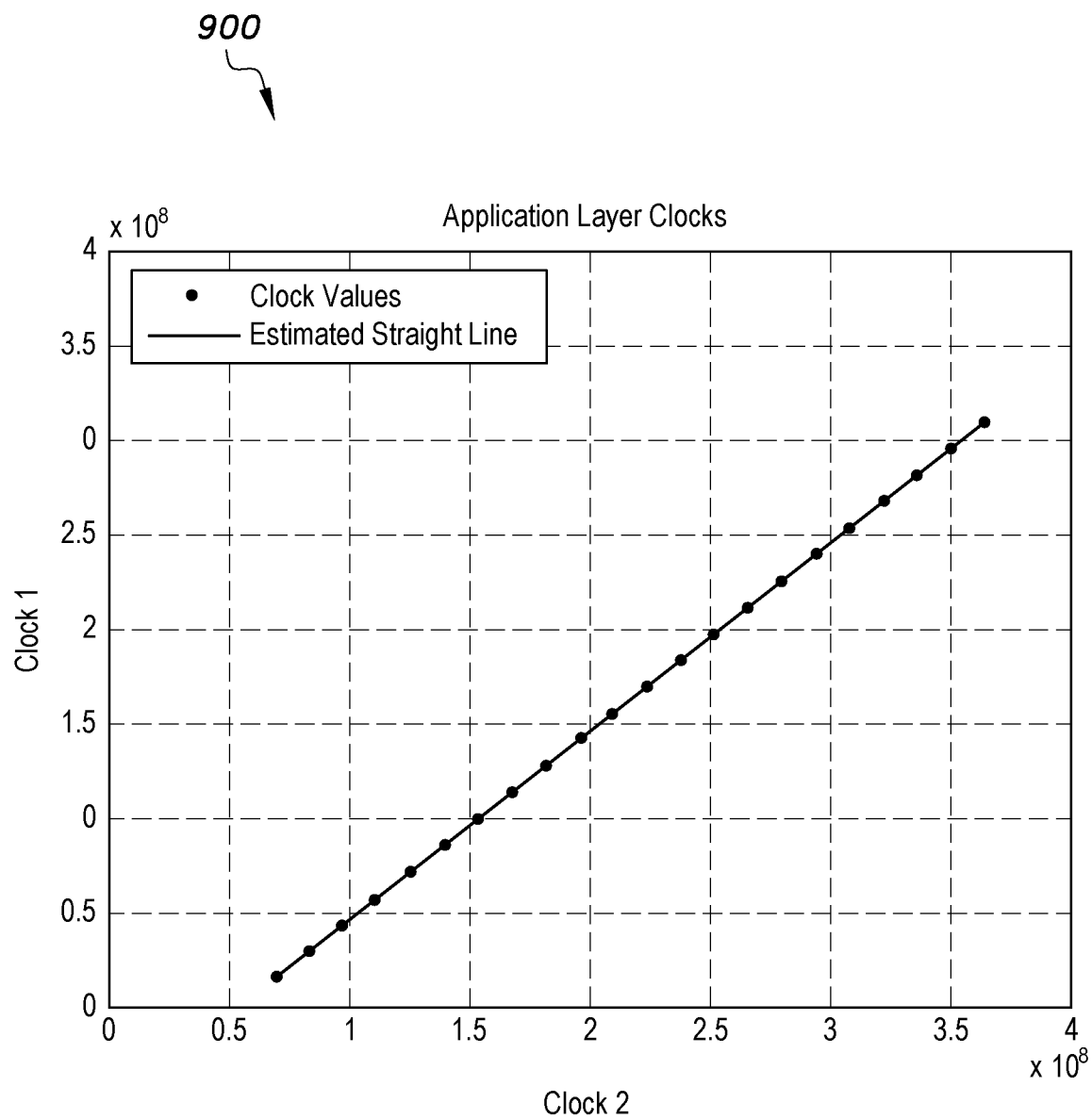
FIG. 6 is a plot showing least squares estimation of application layer frequency clocks of the transmitter and receiver in the system of FIG. 4.

DSKA 500*a* transmits its time stamps to DSKB 500*b*. On reception of the time-stamp message, DSK B also notes down its clock value. A total of 22 time stamps are transmitted from DSK A 500*a* to DSK B 500*b*. These time stamps are used to compute the frequency offset at the application layer. Application layer frequency offset is estimated using LS estimate on the time stamps. Plot 900 of FIG. 6 corresponds to the application layer clocks of DSK A 500*a* and DSK B 500*b* running untethered.

Clock 1 is the clock of DSK A 500*a* and clock 2 is the clock of DSK B 500*b*. LS estimate is used to estimate the frequency offset of the application layer clocks. The slope of the line shown in plot 900 corresponds to the frequency offset of the application layer clocks running on DSK A 500*a* and DSK B 500*b*.

The application layer clock offset comes out to be 1.4557 ppm for 22 time stamps. That is nearly same as the physical layer offset, that is, 1.3139 ppm.

Figure 7:
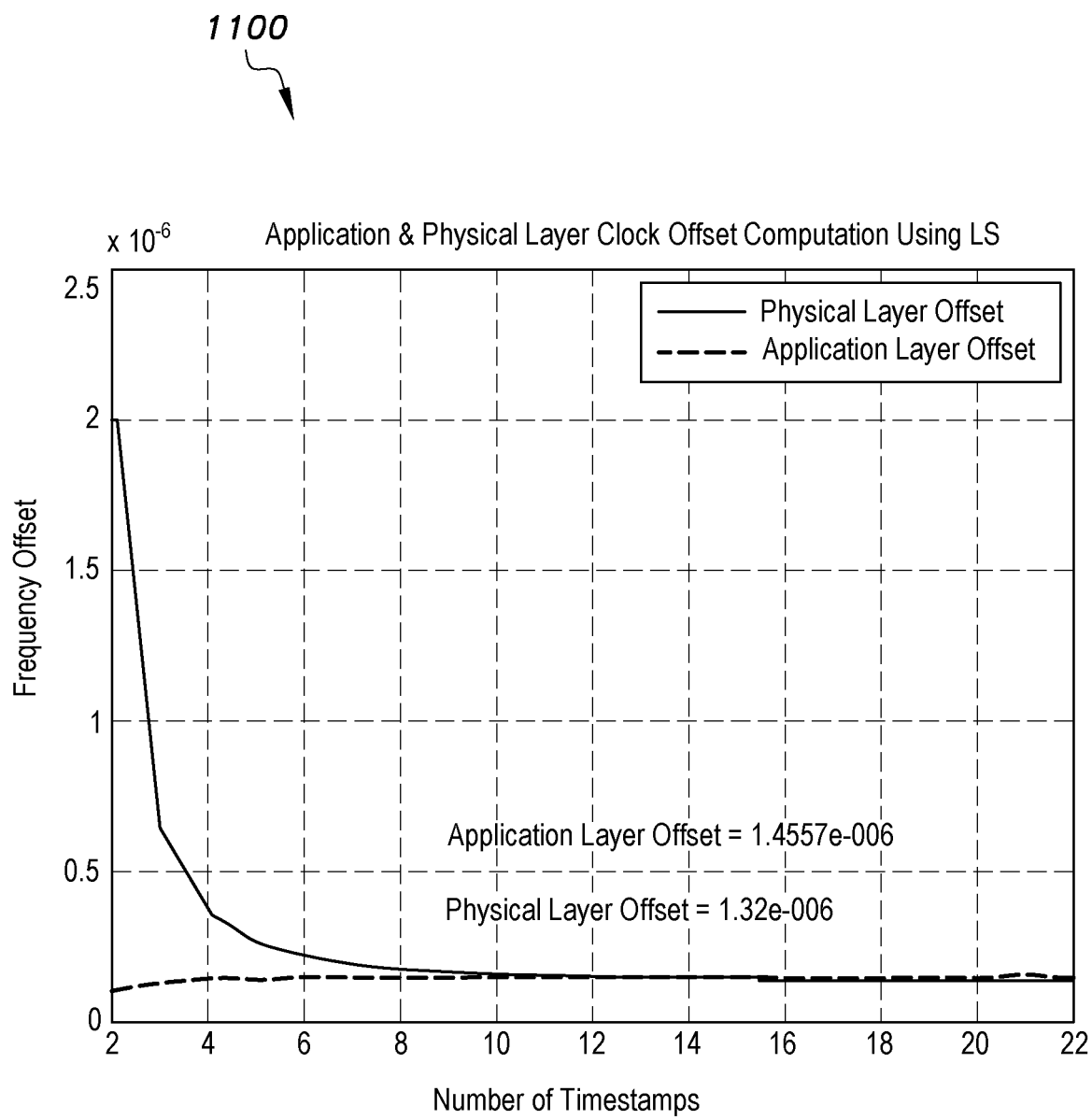
FIG. 7 is a plot showing comparison of application layer frequency offset and physical layer frequency offset in the system of FIG. 4.

Graph 1100 of FIG. 7 shows a comparison of the physical layer frequency offset and the application layer frequency offset. The frequency offset at the application layer and at the physical layer converges to nearly the same value. If accuracy needs to be improved, then an increased number of time stamps is required to converge the application layer frequency offset to the physical layer frequency offset. This comparison shows that the frequency offset at both the layers of the nodes is the same, as expected, and the physical layer frequency offset can be applied to application layer clocks for the correction of clock frequency. This approach saves the amount of energy required to distribute time stamps and compute frequency offset at the application layer, since physical layer frequency offset can be applied at the application layer.

Another experiment is conducted to verify the cross-layer approach using three DSKs to represent a wireless sensor network of three nodes. A selected DSK transmits a beacon to two other DSKs, and they synchronize in time phase and frequency using the proposed cross-layer approach. This experiment also results in a conclusion that the physical layer time frequency offset (drift) is substantially the same as the application layer time frequency offset, and can therefore be used for application layer clock correction.

The present cross-layer time synchronization method is also simulated. The simulation consists of two synchronization systems, one at the physical layer and one at the application layer. Binary PAM is used as the modulation scheme at the transmitter side, with symbols +1 and −1. A total of 3,000 random symbols are generated with a symbol rate of 1000 symbols/s.

The sampling rate is set to be 8,000 samples/s. The samples per symbol are computed to be 8. The binary PAM symbols are up-sampled by 8 and pulse shaped using a square root raise cosine with 50% excess bandwidth and transmitted over the perfect channel. It is assumed that the frequency offset of $(1-901/900)=1.111111 \times 10^{-3}$ is present between the sampling (physical layer) clocks of transmitter and receiver. At the receiver side, the data after matched filter is down-sampled to 2 samples/symbol and fed to a symbol timing synchronization system using ZC-TED, piecewise parabolic interpolator, proportional plus integrator loop filter and modulo-1 counter interpolator control.

The same transmitter and receiver with this frequency offset are considered for the application layer clock. Application layer clock of the transmitter is assumed to be run for 500 s. The transmitter application layer clock starts from 1 and counts till 100,000 within 500 s, whereas the receiver application layer clock starts from 1 and counts till 99,889, and they keep exchanging their clocks. Using least square estimate, slope of the estimated line is computed to be ((10,000−1)/(99,889−1)) in presence of no noise, and frequency offset is $1-((10,000-1)/(99,889-1))=1.111244 \times 10^{-3}$, which is the same as of physical layer frequency offset. Hence, this simulation shows that the frequency offsets at the physical layer ($1.111111 \times 10^{-3}$) and application layer ($1.111244 \times 10^{-3}$) is substantially the same, and hence the application layer clock can be adjusted using physical layer results.

All of the above experimental results demonstrate that the physical layer clock offset is substantially the same as the application layer offset, and hence can be used for the correction of the application layer clock. The key benefit of using the proposed cross-layer approach is energy efficiency by avoiding synchronization at the application layer. This energy efficiency is achieved by saving the energy required for processing, as well as transmission of multiple time stamps. Over a network of thousands of nodes, this saved energy will grow exponentially and can lead to longer lifetime of the wireless network. A marginal drawback could be the size of the cross-layer packet that must be adjusted such that the receiving node can extract the time offset information properly. It is envisaged that the proposed cross-layer approach opens new avenues to achieve time synchronization in any wireless network in upper layers instead of re-estimating time offset. The implementation of the proposed approach is not limited only to wireless sensor networks, but it can also estimate offsets in multiuser cases, such as cooperative communication. Cross-layer design helps to make any distributed system energy efficient.

Energy efficiency of the present cross-layer design is analyzed as follows. Energy at the application layer is the energy required to transmit time stamps. A time stamp transmission corresponds to one packet transmission, and the energy required to transmit one packet is the same amount of energy required to transmit one time stamp.

The cross-layer time synchronization method uses one packet to synchronize in time phase and time frequency (drift), and that eliminates the need of application layer time synchronization protocol, and hence it saves the energy that would otherwise be required for computations and transmission of multiple time-stamp exchanges and proves good for the energy-constrained environments.

The experimentation results show that the heart of both the physical layer and the application layer clock is a hardware oscillator (clock). The frequency offset (drift) at the application layer and at the physical layer is the same offset that occurs in the hardware clock, as both of the mentioned clocks are derived from the hardware clock. That is why the frequency offset computed at the physical layer is computed to be substantially the same as the frequency offset at the application layer, and can be corrected directly using the physical layer clock frequency offset. There will be no need to use any multiple message exchange algorithm at the application layer to set the application layer clock frequency offsets. This cross-layer design can be used in any distributed wireless network, such as a wireless sensor network. This approach can also estimate offsets in a multiuser case, such as cooperative communication. Nodes do not have to participate in synchronization procedures sequentially for higher layer synchronization, and instead, a cross-layer approach can estimate all offsets in simultaneous cooperative synchronization. This scheme can be extended in other related areas, such as M2M and IoT with respect to WSN and other generic systems.

It is to be understood that the present invention is not limited to the embodiments described above, but encompasses any and all embodiments within the scope of the following claims.

We claim:

1. A cross-layer time synchronization method, comprising the steps of:
    obtaining information about a clock frequency offset from a timestamp-embedded message provided by a physical layer (PHY) timing recovery module;
    synchronizing clock time of layers above the PHY using the information provided by the PHY timing recovery module;
    producing a plurality of samples at matched filter outputs during each interval of a symbol, such that one of the samples is aligned with a maximum eye opening of a selected pulse shape; and
    feeding an n-th matched filter output, $x(nT)$, to a piecewise parabolic interpolator for a k-th interpolant as:

$$x((m(k)+\mu(k))T) =$$
$$\left(\frac{\mu(k)^3}{6} - \frac{\mu(k)}{6}\right)x((m(k)+2)T) - \left(\frac{\mu(k)^3}{2} - \frac{\mu(k)^2}{2} - \mu(k)\right)x((m(k)+1)T) +$$
$$\left(\frac{\mu(k)^3}{2} - \mu(k)^2 - \frac{\mu(k)}{2} + 1\right)x(m(k)T) -$$
$$\left(\frac{\mu(k)^3}{6} - \frac{\mu(k)^2}{2} + \frac{\mu(k)}{3}\right)x((m(k)-1)T),$$

wherein $m(k)$ is a base point index, $\mu(k)$ is a fractional change, and $T$ is a symbol time.

2. The cross-layer time synchronization method as recited in claim 1, further comprising the step of calculating the base point index and the fractional change by modulo-1-counter interpolation control.

3. The cross-layer time synchronization method as recited in claim 2, further comprising the step of feeding the matched filter outputs to a zero-crossing timing error.

4. The cross-layer time synchronization method as recited in claim 3, wherein the step of synchronizing the clock time of layers above the PHY comprises calculating a frequency offset on a slope, in, of the fractional change, $u(k)$.

5. The cross-layer time synchronization method as recited in claim 4, further comprising the step of calculating a sample rate, $f_s$:

$$f_s = (2+m)f_d,$$

wherein $f_d$ is a symbol rate.

6. The cross-layer time synchronization method as recited in claim 5, further comprising the step of iteratively calculating a set of modulo-1 counter values, n, as:

$$\eta(n+1) = (\eta(n) - W(n)) \bmod 1,$$

wherein $W(n) = 1/N + v(n)$, where $W(n)$ is an n-th weight, N represents a total number of time stamps, and $v(n)$ is an output of an n-th loop filter.

7. The cross-layer time synchronization method as recited in claim 6, wherein the step of calculating the fractional change comprises calculating the k-th fractional change as a function of the k-th base point index as:

$$\mu(m(k)) = \frac{\eta(m(k))}{W(m(k))}.$$

* * * * *